March 18, 1952 E. L. SCHELLENS 2,589,293
SMALL ELECTRIC MOTOR
Filed Dec. 14, 1949 2 SHEETS—SHEET 1
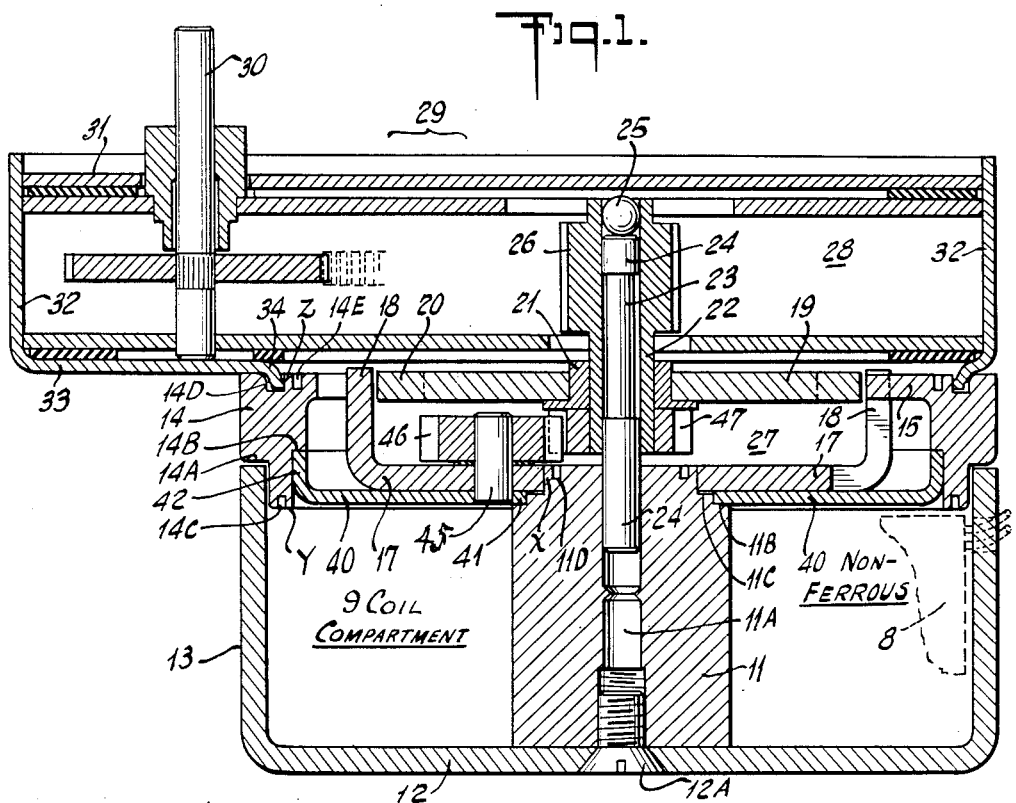
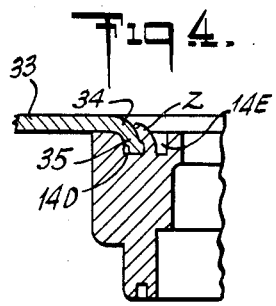
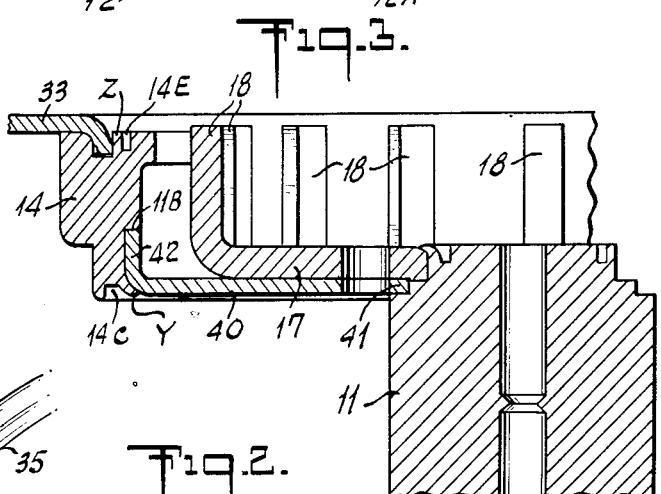
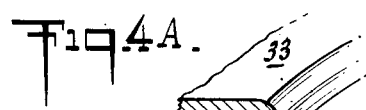
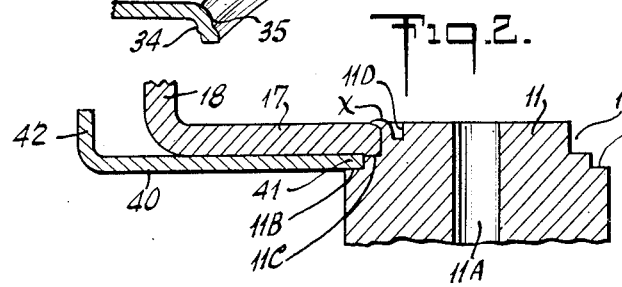
INVENTOR:
E. L. Schellens
BY Morrison, Kennedy
& Campbell
ATTORNEYS.

March 18, 1952  E. L. SCHELLENS  2,589,293
SMALL ELECTRIC MOTOR
Filed Dec. 14, 1949  2 SHEETS—SHEET 2
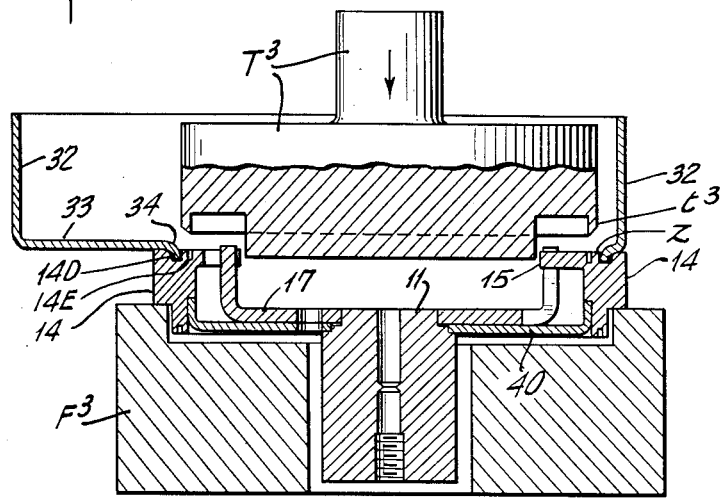
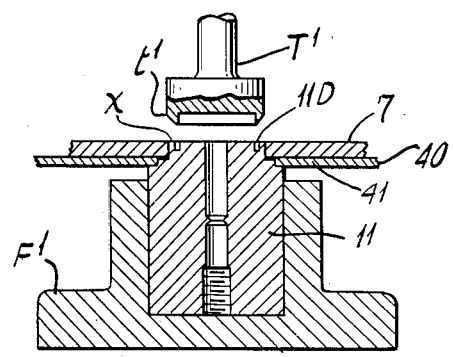
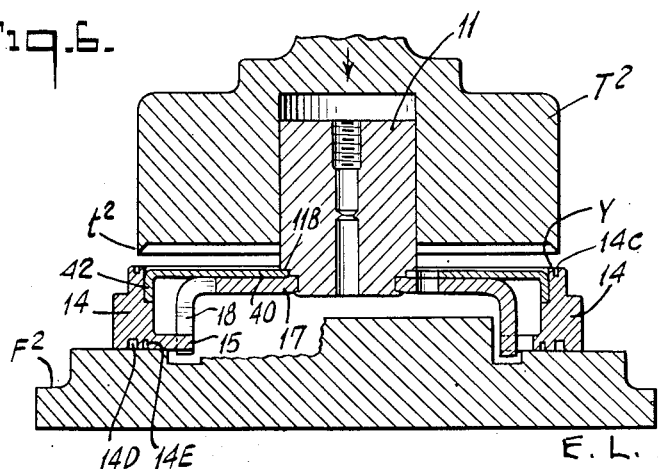
INVENTOR:
E. L. Schellens
BY Morrison, Kennedy & Campbell
ATTORNEYS.

Patented Mar. 18, 1952

2,589,293

UNITED STATES PATENT OFFICE 2,589,293

SMALL ELECTRIC MOTOR

Eugene L. Schellens, Essex, Conn., assignor to R. W. Cramer Company, Incorporated, Centerbrook, Conn., a corporation of Connecticut Application December 14, 1949, Serial No. 132,812

9 Claims. (Cl. 172—36)

This invention relates to small electric motors, such as synchronous motors, whether of the A. C. inductor or other type. Such motors conventionally have certain basic elements, such as a multipoled, coil-energized, field structure or stator, and cooperative therewith a multipoled rotor carried upon the motor shaft or sleeve; with usually a reducing gear train driven from what for convenience is herein termed the front or rotor end of the shaft. Such motors are of great advantage and have come into very large practical use, as for clocks, relays and various other light driving purposes. The nearest prior small electric motor of the type mentioned known to this applicant is that disclosed in U. S. Patent No. 2,492,197 granted December 27, 1949, upon the invention of applicant, the application for which prior case was copending with this present case, which may be considered a partial continuation of the prior case, which in turn may be referred to for certain details not herein illustrated.

A general object of the present invention is to improve the general structure and framing, and other stationary and component features of motors of the kind referred to. Certain other portions of the herein disclosed motor, including the rotor and its mode of cooperation with the stator, may be substantially conventional.

Another object is to isolate and seal off from each other, by means of a non-ferrous cross wall or partition, in an improved and effective manner, the motor front space or compartment which contains the rotor and other parts, running in oil, and the annular rear space or compartment wherein is located the energizing coil of the stator, thus shielding the coil from injurious access of oil thereto.

In said prior case the stationary general or frame elements, including the iron stator members and the non-ferrous partition wall, were assembled under control of means for securing proper alinement, and thereupon were treated with molten solder, preferably applied dry at the intended joints and then subjected to induction heating for melting and sealing purposes, and to interconnect the parts. This prior soldering system of connection was extensively used, and proved to be generally satisfactory; but there were certain substantial drawbacks, including the need of heat, tending to interfere with the exactitude and permanence of the interconnections, as well as progressive deterioration of the assembling and holding fixtures and devices, due to the use of solder. It is an additional object of the present invention to obviate the defects thus outlined, namely, by the use of a system of dry or wholly mechanical means of and operations for interlocking the assembled, centered and alined fixed or frame parts of the motor.

Further objects and advantages of the invention will be made clear in the hereinafter following description of an illustrative embodiment thereof. To the attainment of the recited objects and advantages the invention consists in the novel small electric motor and the novel features of combination, construction, arrangement and method and details herein illustrated or described.

The invention consists, in one specific aspect, of the assembled motor elements, especially the fixed elements, herein illustrated and described generally as follows. The stator as a whole has successive iron portions providing the magnetic circuit, including the shouldered central core, or member, and the rear and peripheral walls extending outwardly and frontwardly from the core rear end, and with an interior fixed flange wall or ring extending outwardly and frontwardly from the core front end. Said iron portions define the annular compartment to receive the stator coil. The front terminal of said peripheral wall is formed, and may be considered, as a pole-carrying fixed outer field ring, while the flange wall as a whole, or its body, may be considered as an inner field ring. These two rings are adjacently arranged and shaped to provide outer and inner series respectively of stator poles. The motor comprises also an interior non-magnetic partition or disk wall of annular form located adjacently frontward of the coil compartment but adjacently rearward of said flange wall or inner ring. The partition inner rim is permanently joined to both the core member and the flange wall or inner ring by a liquid-tight first joint, while its outer or peripheral rim is joined to the inner side of the peripheral wall or outer ring by a liquid-tight second joint. The motor so described is characterized in that the partition inner edge is engaged and seated upon the core shoulder or step in a position between and engaging both such shoulder or seat and the inner margin of the flange wall or inner ring. The motor is characterized also in that the first of said joints consists of a staked lip extending from the front end of the core and tightly swaged over and held under high pressure upon the flange wall inner margin, whereby such flange wall margin is held in squeezing pressure against the inner rim of the partition, which in turn bears against the core shoulder, thereby permanently joining and locking tightly the core, the flange wall or ring and the interposed partition. The motor is characterized further in that the second joint consists of a similarly staked lip extending inwardly from the outer field ring and swaged tightly over upon the partition outer rim. Thus the isolating of the coil compartment from the rotor compartment is accomplished. As an optional supplement the gear case rear wall has a rear flange or bent end annularly engaging a groove in the front end of the outer field ring and there staked by an annular metal lip swaged from the field ring front face to overlie the rear wall flange and unify the gear case with the outer field ring and other permanent frame parts. The stator core and field rings to be liquid tight should be machined; and the partition also should be accurately preformed at both rims.

In the accompanying drawings, Fig. 1 is a central sectional view of a small motor embodying the invention hereof, shown in a posture with its main shaft or spindle placed horizontally, the parts thus being shown as seen from above. The front view appearance and the arrangement and shapes of the poles, as one example, may be ascertained by referring to the first figure of the prior case.

The main permanent or frame elements of the present motor are preferably assembled and interconnected in a special progressive order. As an illustration these main fixed elements comprise the central core member of the stator, the outer poled field ring, and the inner poled or field ring, these parts being composed of iron; and also the non-magnetic partition wall which isolates the stator coil compartment from the rotor compartment; and supplementally, when desired, the gear case at the front, or rather the flanged rear back wall thereof; all of these elements being herein made rigidly unitary with each other; although Fig. 1 for clearness shows the several joints without the final locking or swaging, shown in detail in the following figures.

Fig. 2, on an enlarged scale, is a diagrammatic sectional view showing the principles of producing the main sub-assembly, in this case of the core, the inner field ring and the partition inner rim, the result constituting the partial construction of the stator, with two joints provided in one step.

Fig. 3 is similar to Fig. 2, but showing the assembling carried further by staking the partition outer rim to the outer field ring, thus by this step combining four stator members, and attaining the object of isolation from each other of the coil and rotor compartments.

Fig. 4 shows the supplemental or final assembling step of staking the gearbox rear wall to the front end of the outer field ring, obviating the disadvantages of using solder thereat. Fig. 4A is a detail view of part of Fig. 4 showing a minor desirable feature.

It will be appreciated that the described order of assembly and interconnection of the main fixed elements is only the preferable method; and that the final rigid structure so produced corresponds with that shown in Fig. 1, but disclosing the means closing the joints not fully shown in Fig. 1.

To disclose more specifically the principles and method of producing the composite unitary rigid framing of the invention three figures are provided, corresponding with Figs. 2, 3 and 4, showing suitable equipment and illustrating in principle the steps for performing the successive interconnecting operations. Thus Fig. 5 shows diagrammatically the mechanically interconnecting steps for the stator portions shown in Fig. 2, involving a staking, spreading or swaging action to unify tightly the core, inner field ring and partition; a preferred kind of fixture or anvil piece being indicated, and a cooperating swaging or staking tool. Similarly, Fig. 6 shows a preferred means for interconnecting the outer field ring to the subassembly of Figs. 2 and 5 in the manner shown in Fig. 3, thereby producing the subassembly of four fixed members. The assembly appears inverted in Fig. 6 as the staking is best done that way.

Finally, Fig. 7 shows a preferred means, fixture and staking tool, adapted for interconnecting with the partial assembly of Figs. 3 and 6, a gearbox or its rear wall by the staking thereof to the front end of the outer pole ring, completing the structural operations and framing steps.

Referring to the structural details, the coil 8 for energizing the stator is accommodated within the annular compartment 9. The stator itself, composed of soft iron members or portions 11 to 18, may be of different designs adapted to provide the conventional path of magnetic flux, with which the movable element or rotor 19 cooperates. The stator magnetic members are in endwise alinement, at some places unitary, at other places in abutting contact, with convenient division lines between members. The central core 11 demarks the inner boundary of the coil compartment and is shown as a generally cylindrical iron member formed with an axial bore 11A used for mounting the rotor axle or shaft.

At the rear end of the core is the enclosing rear wall 12, being a separate piece from the core and held in magnetic contact therewith as by an end screw 12A passing through a central aperture of the wall and threaded into the bore of the core. The rear wall extends outwardly from the core, i. e. laterally of the axis, to a peripheral point or corner beyond which the stator extends frontwardly, in the form of a peripheral wall 13.

At its front end the peripheral wall is provided or formed with a terminal piece or enlargement 14, which may be considered as the outer field ring or pole ring of the stator, this carrying an outer series of stator poles 15. In the drawing the peripheral wall 13 is indicated as integral with the rear wall 12, in which case the peripheral wall is separated as shown by a line of division from the fixed outer stator terminal piece or field ring 14. This arrangement permits the combined walls 12 and 13, extending outwardly and frontwardly, to be attached by a sliding fit and bodily removed, being in the form of a cup, surrounding and completing the closure of the coil compartment, while permitting the opening of the compartment for insertion and removal of the coil. On the other hand, if the rear and peripheral walls 12 and 13 have a division line between them, as in said prior patent, the peripheral wall may be formed integrally with the outer field ring of the stator, and only the rear wall removed for access. As shown, the peripheral wall 13 when in place, if separate from the field ring, seats in the outer recess or shoulder 14A of the latter.

The other branch of the stator structure and circuit, commencing at the front end of the axial core 11, is shown as follows. In contact with and extending laterally from the front end of the core is an interior flange wall 17, this constituting a field or pole ring separate from the core and extending first outwardly and then shaped into a front extension, the front part at least of which is formed into a series of inner stator poles 18, having a fixed position adjacent to the outer series 15.

The outer and inner stator pole series 15 and 18 form the conventional double series cooperating with the rotor 19, which has a series of poles 20 and which turns about an axis coincident with the center line of the stator core 11. The rotor is preferably of the conventional disklike shape, having a scalloped or indented rim forming the poles, and these poles being permanently magnetized alternately or in other manner to cooperate with the stator poles.

The rotor, by means of its hub 21, is secured fast upon a rotary sleeve 22, which may be considered the hollow shaft of the rotor. The sleeve in turn is arranged to rotate either with or upon the interior shaft or axle 23, which extends through the sleeve and therebeyond rearwardly into the front end of the bore 11A of the stator core 11. If the central member 23 be a fixed axle or stud its tight engagement in the bore holds it as a steady rod or post. The shaft is shown as having the middle portion of its length reduced somewhat in diameter, leaving front and rear heads 24, with the front head contacted by a confined bearing ball 25.

The enlarged front end of the rotor shaft or sleeve 22 represents or carries a first gear 26, turned directly by the rotor. The rotor and the parts on which it is directly mounted are accommodated within the rotor compartment 27, being an annular space within the front terminals of the stator parts; while the gearing, which may be conventional, is only partly shown, and is accommodated within the gear compartment 28, this being the interior space within the gearbox 29 constituting the front unit of the three general portions of the complete motor. Gearing of any desired kind may be interposed between the first gear 26 and the output shaft 30 projecting from the front wall 31 of the gearbox or case.

The gear case 29 may be of any suitable construction, its front closing wall 31 being preferably permanently united with a circumferential wall 32 which is oval and has, as an inward extension, a rear wall 33, which is annular. The inner margin of the rear wall is formed with a rearwardly bent curved extension or low flange 34 entered within a circumferential receiving groove 14D preformed in the front end of the outer field ring 14. When so assembled the ring and low wall extension are in position for staking. To ensure secure interconnection the low flange near its extreme edge is formed with a slight crimp or shallow gutter 35 which the staking lip Z can overlie to lock this joint.

The non-magnetic partition 40 is composed for example of brass, and is of annular disklike form; and it is located frontward of the coil compartment 9 but to the rear of the flange wall or inner field ring 17. The partition has an inner rim 41 to be interconnected with the core 11 and inner field ring 17, and at its outer rim it is formed to be staked to the outer ring 14, with a curvedly bent extension 42 constituting a foot to be interconnected with the ring 14.

As a collateral device the following is shown in Fig. 1. A short stud 45, projected into the rotor compartment 27, is mounted fixedly with its rear end driven into registering round holes in the ring 17 and partition 40. On this stud turns freely a pinion 46, and this is in mesh with a central gear 47 mounted fast upon the rotor shaft or sleeve, so that the pinion rotates and stops with the shaft. The offset idler pinion 46 meshing with central gear 47 may function as a one-way device on the principles involving the gear 41 and gear 42 of prior Patent No. 2,436,231 of February 17, 1948.

Without at first referring to the assembling steps, the final relative positions of the fixed stator members or sections 11, 14, 17 and 40 will be described in detail. As stated, in Fig. 1 the final interconnecting of the members is not shown, all members however being in their proper relative positions, requiring only the staking or spreading steps by which certain lips, designated X, Y and Z, are swaged over, as from the central core for one of the joints and from the outer field ring for the other or remaining joints.

The radial width of the partition 40 is somewhat greater than the radial spacing between the core 11 and the outer ring 14. This permits the core to be formed with a shoulder or step 11B, which is annular as are the other elements outside of the core; and the inner rim 41 of the partition bears against the shoulder 11B, whereat it may have a snug or close fit upon the reduced end of the core. Beyond the partition rim the core is formed with a cutaway recess 11C adapted to accommodate, with a similar close fit, the inner margin of the inner field ring 17. The described shoulder and the wider recess, as shown, are of such dimension that the ring margin bears directly against the partition rim when assembled. The front surface of the inner ring as thus assembled against the partition front face, may be substantially flush with the front end of the core, as shown. The shoulder 11B is defined in depth by the metal of the core radially inward of the partition position, and it will be noted that this metal extends frontwardly short of the front face of the partition, so that when the ring margin is pressed rearwardly the pressure is taken solely by the partition rim which in turn is backed by the core metal forming the shoulder 11B. In other words a thin annular space is provided inwards of the rim 41 and which reaches rearwards of the front face of the rim, as seen in Figs. 1 and 5, so that the staking pressure upon the ring is received wholly on the rim and not at all on the second shoulder of the core.

By these arrangements the partition and the inner ring take definite assembled positions on the core. These parts moreover are under a substantial pressure, the partition inner rim being under squeezing pressure between the core shoulder 11B and the inner ring margin. Now, when a portion or lip of the metal of the front end of the core is staked, and bent over outwardly and rearwardly against the front face of the ring margin, this effects the tight joint between the three stator members, the core, the inner ring and the partition. The staking or swaging action thus referred to may in some cases be effected without the preformation of a groove 11D to assist the heavy work of deforming the metal of the core member and overturning it to reach, bear against, and lock the ring and partition members as a part of the tight joint between these members. By this plan more core metal is provided for staking.

The interconnection between the outer field ring 14 and the outer rim or bent foot portion of the partition is described as follows. At its inner side the outer ring is formed with a shoulder 14B, provided by a cutaway recess receiving the partition foot 42 and presenting an abutting surface for the extreme edge of the bent rim. The parts shown in Fig. 1 occupy this position, the curved corner of the bent rim of the partition standing adjacent to the inner surface of the ring; while the rear surface of the ring is substantially flush with the body of the partition. At its rear face the ring is formed with a groove 14C, and between this groove and the inner surface remains the metal constituting the lip Y which, when swaged, effects the interconnection at this joint. This groove 14C is preferably preformed, and when the staking or spreading tool is applied to the groove and operated this causes the lip Y to be deformed and swaged toward the curved corner of the partition and preferably spread around that corner into overlapping relation to the outer rim of the partition, thus interlocking the ring and the partition clear around the outer rim of the latter. The shoulder 14B takes the thrust. The description thus far completes what is necessary to provide the desired liquid-tight partition separating the coil compartment from the rotor and gearcase compartments of the motor.

At the front end of the outer field ring 14 is shown the means for effecting the desirable permanent interconnection of gearcase 29 with the stator fixed parts. The rearwardly bent or curved end 34 of the gearcase rear wall 33 is shown engaged in a special recess 14D preformed in the front end surface of the ring. In order to provide ring metal that may be swaged outwardly against and partly over the curved wall extension 34 a second groove 14E is preferably preformed in the front surface of the ring, fairly close to the recess 14D, but leaving enough metal to form the staking or swaging lip Z, which is the part forcibly bent over and against the low projecting edge 34 of the wall 33. To ensure rigid locking of the gearcase unit to the stator unit, or its fixed members, the low wall flange 34 may be preformed or struck with an annular indentation or crimp 35, producing a shallow depression or gutter, as best seen in Fig. 4A, adapted to receive part of the staked metal of the lip Z, as seen in Fig. 2.

The several assembling steps, each followed by a staking or interconnecting step may be varied in their details and in their order of performance. As one example the stator core 11 is first staked, as illustrated in Fig. 2, both to the inner field ring 17 and to the inner rim of the partition 40 assembled therewith, said rim being squeezed or pinched upon the core shoulder 11B by pressure upon the ring, the parts becoming united and joined by the formation, from the metal of the core, of the staking lip X. Following this double-staking first operation, the outer rim 42 of the partition, now attached to the core and inner ring, as in Fig. 3 shown, is staked to the outer ring 14, pressure being applied to force the rim to its seat 14B and the parts becoming joined permanently by the swaging of the lip Y. Thereafter follows the staking of the gearcase wall 33, or its low flange 34, to the outer field ring, namely by deforming and swaging the lip Z of the ring outwardly over and upon the wall flange 34, as is seen in Figs. 4 and 4A. Thus the fixed stator members are united; whereas the remaining stator members 12 and 13 are not permanently secured in place but form a removable cup, as before described, adapted to be placed over the rear end of the outer field ring and thus seated upon the shoulder 14A thereof, where it may be removably secured.

The steps thus described on the diagrams of Figs. 2, 3 and 4 may be performed by the means indicated conventionally in Figs. 5, 6 and 7 respectively. Thus, Fig. 5 shows the core 11, inner ring 17 and partition 40 loosely assembled upright, and engaged upon a special fixture or support F' serving also as a staking anvil. An implement or staking tool T' may be fitted and power-operated, as a punch, to descend, with a pressure or blows, this having an annular blade or staking wedge $t'$, which enters the groove 11D, when such a groove is preformed, or forms its own groove, the wedge being straight at its inner face but inclined outwards at the other side, thereby to force the lip X of core metal to spread outwardly, over and upon the face of the ring, in the manner seen in Fig. 2. The base fixture or anvil F supports properly the three members and takes the thrust of the staking operation.

Likewise, Fig. 6 shows the combined members 11, 17 and 40 assembled loosely with the outer field ring 14 and supported upon a special base fixture $F^2$. The parts are inverted, relative to Fig. 5, so that the tool or punch $T^2$ can act downwardly against the ring, its wedging blade $t^2$ striking into the staking groove 14C; the wedge being inclined in a manner to deform and spread inwardly the lip Y, with the result shown in Fig. 3.

Similarly, referring to Fig. 7, this has a base fixture or jig $F^3$ and cooperating with it a staking tool $T^3$ with wedging or spreading edge $t^3$. The combined members 11, 17, 40 and 14 are assembled with the gearcase wall 33, upon the fixture; and in operation the acting edge $t^3$ enters the preformed groove 14E of the already fixed outer ring 14, thus forcibly spreading the lip Z of ring metal, so as to spread and overlie the low flange 34 and so unify the wall 33 with the ring, with the result of a joint such as shown in Figs. 4 and 4A.

There has thus been described a small electric motor, shown as a synchronous motor, embodying the principles and attaining the advantages of the present invention; but since many matters of combination, operation, method, construction, arrangement and detail may be variously modified without departing from such principles it is not intended to limit the invention to such matters except to the extent set forth in the appended claims.

What is claimed is:

1. A small electric motor of the type described having at the front and rear respectively a poled rotor and a cooperating poled stator, said stator having successive iron portions providing its magnetic circuit and defining an annular coil compartment, including a shouldered central core, and outer and inner pole rings shaped to provide outer and inner series of stator poles; and said motor comprising a non-ferrous metal partition of annular form located adjacently frontward of such coil compartment, with its inner rim connected by a first joint to both said core and said inner pole ring, and its outer rim connected by a second joint to said outer pole ring; and characterized in that the partition has its inner rim extended into engagement between the core shoulder and the inner margin of the inner ring, and in that such first joint comprises a staked lip extending from the front part of the core and tightly swaged over and against such inner margin of the inner ring, whereby the inner ring is held by its inner margin in squeezing pressure against the inner rim of the partition with thrust against the core shoulder, thereby permanently interlocking and joining tightly the core, the inner ring and the interposed partition; and characterized further in that said second joint comprises a staked lip extending from the rear part of the outer pole ring and tightly swaged over and against the partition outer rim, with thrust against the outer pole ring shoulder.

2. A small motor as in claim 1 and wherein the flange wall constitutes the inner one of two pole rings, the outer one of which at its front end is formed with a recess enclosing the bent edge of the rear wall of a gearcase; and the outer pole ring having a staked lip adjacent to said recess, swaged over against the gearcase bent edge in a manner to interlock the outer ring and gearcase thereby to unify rigidly the motor stator fixed portions and the gearcase.

3. A small electric motor of the type set forth having at the front and rear respectively a poled rotor and a cooperating poled stator, said stator having successive fixed iron portions providing its magnetic circuit, including a central core, and walls extending outwardly and frontwardly from the core rear end, providing an outer pole ring, and a flange wall providing an inner pole ring extending outwardly and frontwardly from the core front end, said iron portions defining an annular coil compartment; and said motor characterized in comprising also a non-ferrous bridging and spacing partition of annular form located frontward of such coil compartment but adjacently rearward of said inner pole ring, with its inner rim connected by a first joint to both said core and said inner ring, and its outer rim connected by a second joint to said outer ring, thereby spacing apart and positioning and centralizing the two rings; the inner one of said two joints comprising a staked lip extending from the core portion into a holding position securing the inner rim of said partition to such fixed iron portion.

4. In an electric motor of the type set forth wherein the stator includes an axial core, and concentric therewith an inner pole ring and an outer pole ring, all composed of iron, the core having a reduced end part providing a circumferential shoulder and recess; and in combination therewith a non-ferrous partitioning and centralizing annular disk bridging from ring to ring; the disk being arranged with its inner rim seated and clamped upon said core shoulder, and the inner pole ring having its inner margin seated and clamped upon said disk inner rim with the exposed side thereof substantially flush with the adjacent reduced end part of the core; and the core at such reduced end having an integral lip swaged out from the core metal and extending outwardly and tightly against the inner pole ring inner margin with the parts under high compression; whereby the disk inner rim is held tightly under high squeezing pressure, the thrust of which is taken by the core shoulder, and whereby the core, the inner pole ring and the disk are permanently joined; and means permanently joining the outer rim of the bridging disk to the outer ring, with the latter centered in correct functional relation to the inner pole ring.

5. An electric motor as in claim 4 and wherein the means joining the outer disk rim to the outer field ring consists of a staking lip extending from the ring and overlying the disk rim under pressure.

6. A motor as in claim 5 and wherein the outer ring is formed with a shoulder to take the pressure thrust, and the disk outer rim is formed with a bent foot seated on said shoulder; and wherein the staking lip overlies the curved bend of the disk rim.

7. A motor as in claim 4 and wherein is a gearbox permanently connected to the stator fixed parts, the gearbox having an annular rear wall with a bent low-flange extension for interconnection with the stator outer field ring; and said outer ring having an end recess accommodating said flange extension, and having an integral lip staked over and upon said extension.

8. For a motor of the type set forth, a stator enclosing an annular coil compartment and comprising the following series of iron members, (1) a wall member partially bounding the coil compartment, and, as permanent fixed members, (2) a central core having near one end an annular shoulder, said bounding wall member being attached to and removable from the other end of the core member for access to the coil compartment, (3) an outer field ring, and (4) an inner field ring, the inner margin of which is swaged to the first mentioned core-end beyond said shoulder by mechanical deformation of the core metal; together with an annular partitioning member or disk which is non-ferrous and is held under liquid-tight pressure at its inner rim between the core shoulder and the inner field ring margin, and whose outer rim is secured rigidly and liquid-tightly to the outer field ring; the outer field ring being rigidly supported by said partitioning disk member and thereby indirectly from the central core member.

9. In a small electric motor of the type described, a poled stator having magnetically alined iron portions defining an annular coil compartment, including a shouldered central core, and outer and inner pole rings shaped to provide an outer series surrounding an inner series of stator poles; and said stator comprising a non-ferrous metal partition of annular form located adjacently frontward of such coil compartment, with its outer rim connected oil tightly to the outer pole ring and its inner rim connected oil tightly by a staked joint to both said core and said inner pole ring in such manner as permanently to interlock and join tightly the core, the inner pole ring and the partition.

EUGENE L. SCHELLENS.

REFERENCES CITED

The following references are of record in the file of this patent:

UNITED STATES PATENTS

| Number | Name | Date |
| --- | --- | --- |
| 1,933,440 | Kurz | Oct. 31, 1933 |
| 1,933,590 | Holtz et al. | Nov. 7, 1933 |
| 2,334,040 | Schellens | Nov. 9, 1943 |
| 2,492,197 | Schellens | Dec. 27, 1949 |